(12) United States Patent
Beinborn et al.

(10) Patent No.: US 11,920,530 B2
(45) Date of Patent: Mar. 5, 2024

(54) DELAYING CYLINDER REACTIVATION

(71) Applicant: Cummins Inc., Columbus, IN (US)

(72) Inventors: Aaron William Beinborn, Columbus, IN (US); J. Steven Kolhouse, Columbus, IN (US); Jonathan A. Dickson, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/632,441

(22) PCT Filed: Aug. 4, 2020

(86) PCT No.: PCT/US2020/044849
§ 371 (c)(1),
(2) Date: Feb. 2, 2022

(87) PCT Pub. No.: WO2021/026128
PCT Pub. Date: Feb. 11, 2021

(65) Prior Publication Data
US 2022/0282677 A1     Sep. 8, 2022

Related U.S. Application Data

(60) Provisional application No. 62/882,714, filed on Aug. 5, 2019.

(51) Int. Cl.
*F02D 41/00* (2006.01)
*B60W 10/06* (2006.01)
(Continued)

(52) U.S. Cl.
CPC ......... *F02D 41/0087* (2013.01); *B60W 10/06* (2013.01); *B60W 10/10* (2013.01);
(Continued)

(58) Field of Classification Search
CPC ............. F02D 41/0087; F02D 17/02; F02D 2041/0012; F02D 41/123; F02D 13/06;
(Continued)

(56) References Cited

U.S. PATENT DOCUMENTS 5,562,085 A * 10/1996 Kosuda ................... F02D 17/02
                                                            123/568.24
5,669,349 A *  9/1997 Iwata ....................... F02B 75/20
                                                            123/196 S
(Continued)

FOREIGN PATENT DOCUMENTS

CN         101628580 A        1/2010
DE    10 2014 215 767 A1      2/2016
(Continued)

OTHER PUBLICATIONS

International Search Report and Written Opinion on International Application No. PCT/US2020/044849, dated Oct. 26, 2020, 16 pages.
(Continued)

*Primary Examiner* — Sizo B Vilakazi
*Assistant Examiner* — Brian R Kirby
(74) *Attorney, Agent, or Firm* — FOLEY & LARDNER LLP

(57) ABSTRACT

A method for delaying cylinder reactivation in a vehicle includes identifying, by a controller, a request to exit a cylinder deactivation state. The controller determines if the request is due to a transient condition. If the request is due to the transient condition, the controller analyzes at least one of the transient condition and a condition of the vehicle. The controller determines a first adjustment to the vehicle based on analyzing at least one of the transient condition and the
(Continued)

condition of the vehicle. The first adjustment is configured to mitigate the transient condition. The controller implements the first adjustment.

17 Claims, 2 Drawing Sheets

(51) Int. Cl.
*B60W 10/10* (2012.01)
*F02D 17/02* (2006.01)
*F02D 41/14* (2006.01)

(52) U.S. Cl.
CPC ...... *F02D 17/02* (2013.01); *F02D 2041/0012* (2013.01); *F02D 2041/1412* (2013.01); *F02D 2200/701* (2013.01); *F02D 2200/702* (2013.01)

(58) Field of Classification Search
CPC ............... F02D 41/126; F02D 2250/21; F02D 2041/001; F02D 41/12; B60W 10/06; B60W 20/00; B60W 10/08; B60W 20/10; B60W 30/182; Y02T 10/12
USPC ................................ 123/198 F, 481, 198 DB
See application file for complete search history.

(56) References Cited

U.S. PATENT DOCUMENTS

| | | | | |
|---|---|---|---|---|
| 6,244,242 | B1* | 6/2001 | Grizzle | F02D 41/0087 123/481 |
| 6,516,254 | B1* | 2/2003 | Wakashiro | B60W 10/06 903/905 |
| 6,615,804 | B2 | 9/2003 | Matthews et al. | |
| 6,687,602 | B2* | 2/2004 | Ament | F02D 11/105 701/107 |
| 6,874,463 | B1* | 4/2005 | Bolander | F02D 11/105 123/481 |
| 6,886,524 | B2* | 5/2005 | Hanada | B60W 10/06 903/917 |
| 7,044,101 | B1* | 5/2006 | Duty | F02D 17/02 123/198 F |
| 7,836,866 | B2* | 11/2010 | Luken | F02D 17/02 123/481 |
| 7,963,267 | B2* | 6/2011 | Surnilla | F02D 41/0087 123/21 |
| 8,606,483 | B2* | 12/2013 | Krupadanam | F02D 41/0087 701/101 |
| 9,598,065 | B2* | 3/2017 | Mori | B60W 50/0098 |
| 9,835,097 | B1* | 12/2017 | Schrewe | F02D 41/0002 |
| 9,964,064 | B1 | 5/2018 | Cribbins et al. | |
| 2002/0116112 | A1* | 8/2002 | Wakashiro | B60K 6/485 903/905 |
| 2002/0162540 | A1* | 11/2002 | Matthews | F02D 17/02 123/481 |
| 2004/0035113 | A1* | 2/2004 | Hanada | F02D 41/0087 903/917 |
| 2004/0055569 | A1* | 3/2004 | Matthews | F02D 41/0087 123/481 |
| 2004/0209736 | A1* | 10/2004 | Takagi | F02D 41/0087 477/111 |
| 2004/0231634 | A1* | 11/2004 | Sen | F02D 17/02 123/198 F |
| 2005/0000479 | A1* | 1/2005 | Niki | B60W 20/13 123/90.15 |
| 2005/0003925 | A1* | 1/2005 | Wakashiro | B60W 20/13 903/917 |
| 2005/0010353 | A1* | 1/2005 | Matsubara | B60K 6/543 903/918 |
| 2006/0107919 | A1* | 5/2006 | Nishi | F02D 13/06 123/198 F |
| 2006/0196463 | A1* | 9/2006 | Pallett | B60K 6/445 123/192.1 |
| 2007/0042863 | A1* | 2/2007 | Takagi | F02D 41/0087 477/111 |
| 2007/0191183 | A1 | 8/2007 | Petridis et al. | |
| 2007/0282520 | A1* | 12/2007 | Cradick | B60W 20/00 701/123 |
| 2010/0010732 | A1* | 1/2010 | Hartman | G01C 21/3484 701/532 |
| 2010/0012053 | A1* | 1/2010 | Surnilla | F02D 41/0087 123/21 |
| 2011/0040471 | A1 | 2/2011 | Krupadanam et al. | |
| 2011/0130943 | A1* | 6/2011 | Hysko, Jr. | B60K 26/021 701/103 |
| 2011/0307158 | A1* | 12/2011 | Imamura | F02P 11/00 701/102 |
| 2012/0197497 | A1 | 8/2012 | Kato | |
| 2012/0298070 | A1* | 11/2012 | Akinyemi | F02D 41/0047 123/294 |
| 2013/0327292 | A1 | 12/2013 | Ostertag | |
| 2014/0373810 | A1 | 12/2014 | Grob et al. | |
| 2015/0197243 | A1* | 7/2015 | Johri | B60W 10/10 180/65.265 |
| 2015/0252743 | A1* | 9/2015 | Glugla | F02D 17/02 701/104 |
| 2016/0108835 | A1* | 4/2016 | Kees | F02D 41/0007 123/344 |
| 2016/0146136 | A1 | 5/2016 | Surnilla et al. | |
| 2016/0186672 | A1* | 6/2016 | Mehrotra | F01N 3/2006 60/274 |
| 2016/0201532 | A1 | 7/2016 | Chanko et al. | |
| 2016/0222898 | A1* | 8/2016 | Ulrey | F02D 41/12 |
| 2017/0030257 | A1* | 2/2017 | Wu | F02B 39/16 |
| 2017/0080916 | A1* | 3/2017 | Eo | B60W 10/08 |
| 2017/0204799 | A1* | 7/2017 | Follen | F02D 41/008 |
| 2017/0356367 | A1* | 12/2017 | Glugla | F02D 41/0087 |
| 2017/0356371 | A1 | 12/2017 | Rollinger et al. | |
| 2018/0057001 | A1* | 3/2018 | Hu | G08G 1/0962 |
| 2018/0238249 | A1* | 8/2018 | Soliman | F02D 41/0087 |
| 2019/0032585 | A1* | 1/2019 | Kelly | F01N 3/10 |

FOREIGN PATENT DOCUMENTS

| | | |
|---|---|---|
| JP | 2006-283720 | 10/2006 |
| WO | WO-2018/081062 A1 | 5/2018 |
| WO | WO-2018/219520 A1 | 12/2018 |
| WO | WO-2020072828 A1 * | 4/2020 |

OTHER PUBLICATIONS

Office Action in CN 202080055171.8 dated Apr. 24, 2023, 11 pages, with English translation.
EP Search Report for Application No. EP20849779.2 dated Jul. 17, 2023. 8 pages.
2nd Office Action issued in corresponding Chinese Patent Application No. 202080055171.8, dated Oct. 17, 2023, 15 pages with English translation.

* cited by examiner

DELAYING CYLINDER REACTIVATION

CROSS-REFERENCE TO RELATED APPLICATIONS

The present application claims priority to U.S. Provisional Application No. 62/882,714, filed Aug. 5, 2019, which is incorporated herein by reference in its entirety.

TECHNICAL FIELD

The present disclosure relates generally to systems and methods for delaying cylinder reactivation in a vehicle.

BACKGROUND

Cylinder deactivation ("CDA") can be used to deactivate one or more cylinders in an engine of a vehicle (e.g., cars and/or trucks) while the engine is operating. Deactivating one or more cylinders may increase fuel economy and/or cause an increase to engine out temperature which may be beneficial to an aftertreatment system. While operating in a CDA state where one or more cylinders are deactivated, the engine generally creates less power while it is operating. A CDA state can be initiated by a computer system and/or software in a vehicle when the computer system and/or software determines that the vehicle can operate efficiently with fewer cylinders. For example, a truck may require the use of all cylinders while accelerating from a stop while towing a load, but may require fewer cylinders when cruising at a constant speed on a highway while towing. When driving conditions change while operating in a CDA state, the computer system and/or software may determine that all cylinders should be activated. However, if the changing conditions are short in duration or small in nature, activating all cylinders may be unnecessary.

SUMMARY

In one set of embodiments, a method for delaying cylinder reactivation in a vehicle includes identifying, by a controller, a request to exit a cylinder deactivation state for an engine system of the vehicle. The controller determines if the request is due to a transient condition. If the request is due to the transient condition, the controller analyzes at least one of the transient condition and a condition of the vehicle. The controller determines a first adjustment to the vehicle based on analyzing at least one of the transient condition and the condition of the vehicle. The first adjustment is configured to mitigate the transient condition. The controller then implements the determined first adjustment.

In another embodiment, a system for delaying cylinder reactivation in a vehicle includes an engine system comprising a first cylinder and a second cylinder, and a controller coupled to the engine system. The controller is configured to identify a request to exit a cylinder deactivation state for the engine system and determine whether the request is due to a transient condition. In response to the controller determining that the request is due to the transient condition, the controller performs an analysis of at least one of the transient condition and a condition of the vehicle. The controller is further configured to determine a first adjustment to the vehicle based on the analysis, where the first adjustment configured to mitigate the transient condition, and implement the first adjustment to the vehicle.

In yet another embodiment, a method for delaying cylinder reactivation in a vehicle that includes an engine system coupled to a controller, a sensor, and a network connection includes identifying a request to exit a cylinder deactivation state for the engine system. The method further includes determining if the request is due to a transient condition. In response to determining that the request is due to the transient condition, the method includes analyzing at least one of the transient condition and a condition of the vehicle. A first adjustment to the vehicle is determined based on the analysis and is configured to mitigate the transient condition. The first adjustment to the vehicle is then implemented.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

Following below are more detailed descriptions of various concepts related to, and implementations of, methods, apparatuses, and systems for delaying cylinder reactivation in a vehicle. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Implementations herein relate to a system and method for delaying cylinder reactivation in a vehicle. In some implementations, a vehicle is equipped with a controller to control cylinder operation in the vehicle. The controller is in communication with a group of sensors that provide the controller with data regarding the vehicle and the immediate surroundings. The controller may also be in communication with a network connection, where the network connection provides the controller with data unavailable to the sensors, such as traffic data. The controller analyzes data from the sensors and/or the network connection and determines when to initiate a CDA state (e.g., when to deactivate one or more cylinders in the vehicle), and when to remove a CDA state (e.g., when to reactivate one or more cylinders in the vehicle). In some embodiments, the controller may determine that conditions exist that would normally require removal of a CDA state, but because the conditions are transient (e.g., short in duration), removal of the CDA state would not be efficient. In such embodiments, the controller may make other adjustments to the vehicle operation to mitigate the transient condition.

II. Example Cylinder Deactivation System

Figure 1:
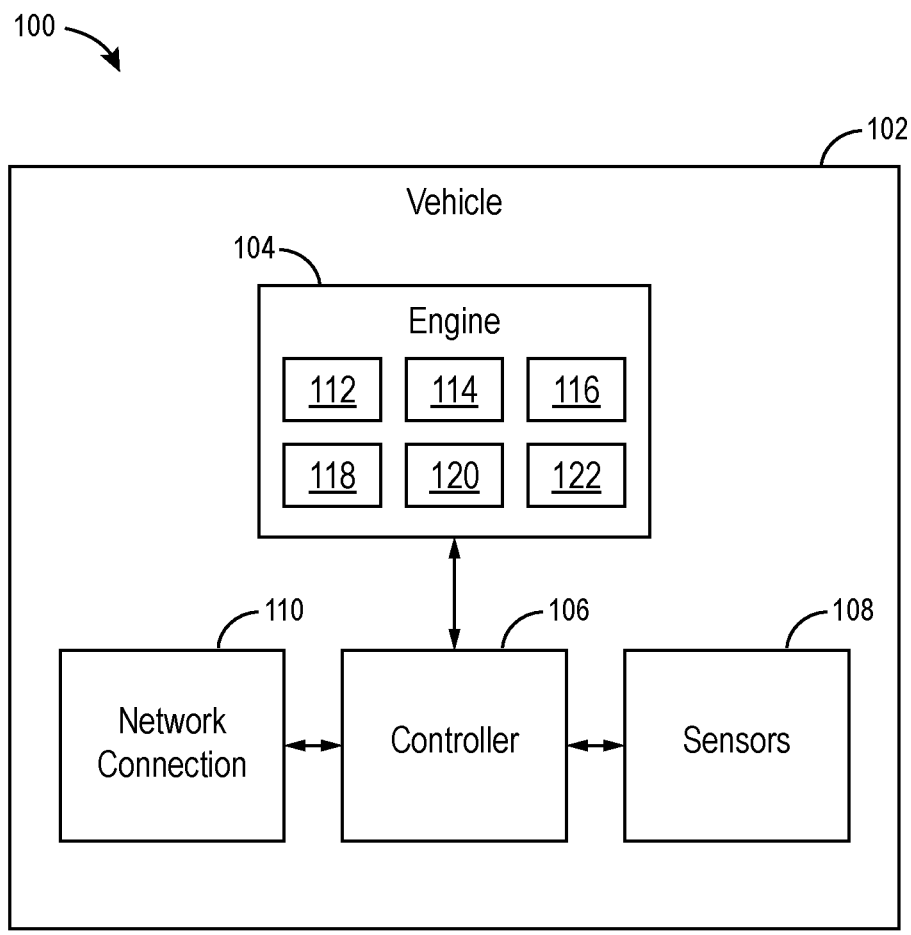
FIG. 1 is a block diagram of a cylinder deactivation system, according to a particular embodiment.

FIG. 1 is a block diagram of a cylinder deactivation system 100, according to a particular embodiment. The cylinder deactivation system 100 is shown to include a vehicle 102. The vehicle 102 further includes an engine 104, a controller 106, sensors 108, and a network connection 110. The engine 104 further includes a first cylinder 112, a second cylinder 114, a third cylinder 116, a fourth cylinder 118, a fifth cylinder 120, and a sixth cylinder 122 (collectively referred to herein as "cylinders 112-122"). It should be understood that, while six cylinders are represented in FIG. 1, the number of cylinders may vary depending upon system configurations and requirements.

The vehicle may include an on-road or an off-road vehicle including, but not limited to, line-haul trucks, mid-range trucks (e.g., pick-up trucks), cars, boats, tanks, airplanes, locomotives, mining equipment, and any other type of vehicle that may utilize a CDA mode. The vehicle may include a powertrain system, a fueling system, an operator input/output device, one or more additional vehicle subsystems, etc. The vehicle may include additional, less, and/or different components/systems, such that the principles, methods, systems, apparatuses, processes, and the like of the present disclosure are intended to be applicable with any other vehicle configuration. It should also be understood that the principles of the present disclosure should not be interpreted to be limited to vehicles; rather, the present disclosure is also applicable with stationary pieces of equipment such as a power generator or genset. The engine 104 is electrically coupled to the controller 106, and can be any type of engine that includes cylinders to generate power. Examples of the engine 104 include, but are not limited to, internal combustion engines (e.g., gasoline, natural gas, or diesel engines), hybrid engines (e.g., a combination of an internal combustion engine and an electric motor), and any other suitable engine. The cylinders 112-122 can be any type of cylinders suitable for the engine in which they are disposed (e.g., sized and shaped appropriately to receive pistons).

The controller 106 is coupled and, particularly electronically coupled, to the engine 104, the sensors 108, and the network connection 110. The controller 106 can be any type of device or system configured to receive input from the sensors 108 and the network connection 110, analyze the input, and determine whether to activate or deactivate any of the cylinders 112-122. In some embodiments, the controller 106 can comprise a computer system including one or more processing circuits comprising a processor and a memory, wherein the processor executes software located within the memory. The software may contain programs and/or algorithms directed to determining whether to activate or deactivate engine cylinders based on available data. The controller may be an electronic control unit included with or similar to an engine control module or unit.

The processor may be a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Accordingly, the processor may be a microprocessor, a different type of processor, or state machine. The processor also may be implemented as a combination of computing devices, such as a combination of a DSP and a microprocessor, a plurality of microprocessors, one or more microprocessors in conjunction with a DSP core, or any other such configuration. In some embodiments, the processor may be two or more processors. Alternatively or additionally, the processors may be structured to perform or otherwise execute certain operations independent of the other co-processors. In other example embodiments, the processors may be coupled via a bus to enable independent, parallel, pipelined, or multi-threaded instruction execution. All such variations are intended to fall within the scope of the present disclosure.

The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be coupled to the processor to provide computer code or instructions to the processor for executing at least some of the processes described herein. Moreover, the memory may be or include tangible, non-transient volatile memory or non-volatile memory. Accordingly, the memory may include database components, object code components, script components, or any other type of information structure for supporting the various activities and information structures described herein.

The controller may include one or more processing circuits, which such processing circuits being disposed in one unit or multiple discrete components that are distributed across one or more locations. In the example shown and described herein, the controller 106 is a singular computer processing unit, but this configuration is not meant to be limiting as other variations are possible as mentioned above.

The sensors 108 are electronically coupled to the controller 106 and are configured to provide the controller 106 with data generated by the sensors 108. The sensors 108 can include one or more sensors configured to detect conditions within the vehicle 102 and external to the vehicle 102. For example, the sensors 108 can include one or more of an accelerometer, a thermometer, a gyroscope, a brake sensor, a gear sensor, a battery sensor, an engine-state sensor, and an optical sensor (e.g., radar, Light Detection and Ranging (LIDAR), and other optical sensing devices). An accelerometer is operable to detect the acceleration of the vehicle 102 (e.g., whether the speed of the vehicle 102 is increasing, decreasing, or staying the same). A thermometer is configured to detect the temperature of the engine 104. A gyroscope detects the position and orientation of the vehicle 102 (e.g., whether the vehicle 102 is moving uphill, downhill, etc.). A brake sensor is configured to detect the status of various brake systems in the vehicle 102. For example, a brake sensor can determine the status of an engine brake, a service brake, and/or a regenerative brake (e.g., whether the brake is in use, the frequency of use, etc.). A gear sensor detects the gear in which the transmission is operating and the duration of the transmission being in a certain gear. A battery sensor is operable to detect the power remaining in a conventional battery or a hybrid battery, and the usage level of the battery (e.g., how much power is being pulled from the battery by the vehicle 102). An engine-state sensor is configured to determine the state of a hybrid engine (e.g., whether the engine is running on fuel or electric at a given time, or over a specified time period). An optical sensor scans and/or surveys the area immediately surrounding the vehicle 102 (e.g., within approximately 500 feet of the vehicle 102). The optical sensor can convey information related to the configuration of the road and/or terrain in the direction in which the vehicle 102 is traveling and the position of the vehicle 102 relative to other nearby vehicles.

The network connection 110 is electrically coupled to the controller 106 and is configured to provide the controller 106 with data generated from sources external to the vehicle 102. For example, the network connection 110 can receive global positioning system ("GPS") data regarding the current and future position of the vehicle 102. The network connection 110 can also receive data related to current and future traffic information. As used herein, the term "traffic information" refers to information such as traffic patterns, travel times, congestion levels, traffic speed, construction, the location and direction of other vehicles, and vehicle infrastructure (e.g., traffic signals, railroad signals, emergency vehicle patterns, and any other infrastructure related items). The network connection 110 can also receive data related to weather conditions. As used herein, the term "weather conditions" refers to current and future weather conditions (e.g., temperature, precipitation, wind speed, visibility levels, and any other weather related items).

III. Example Cylinder Deactivation Method

Figure 2:
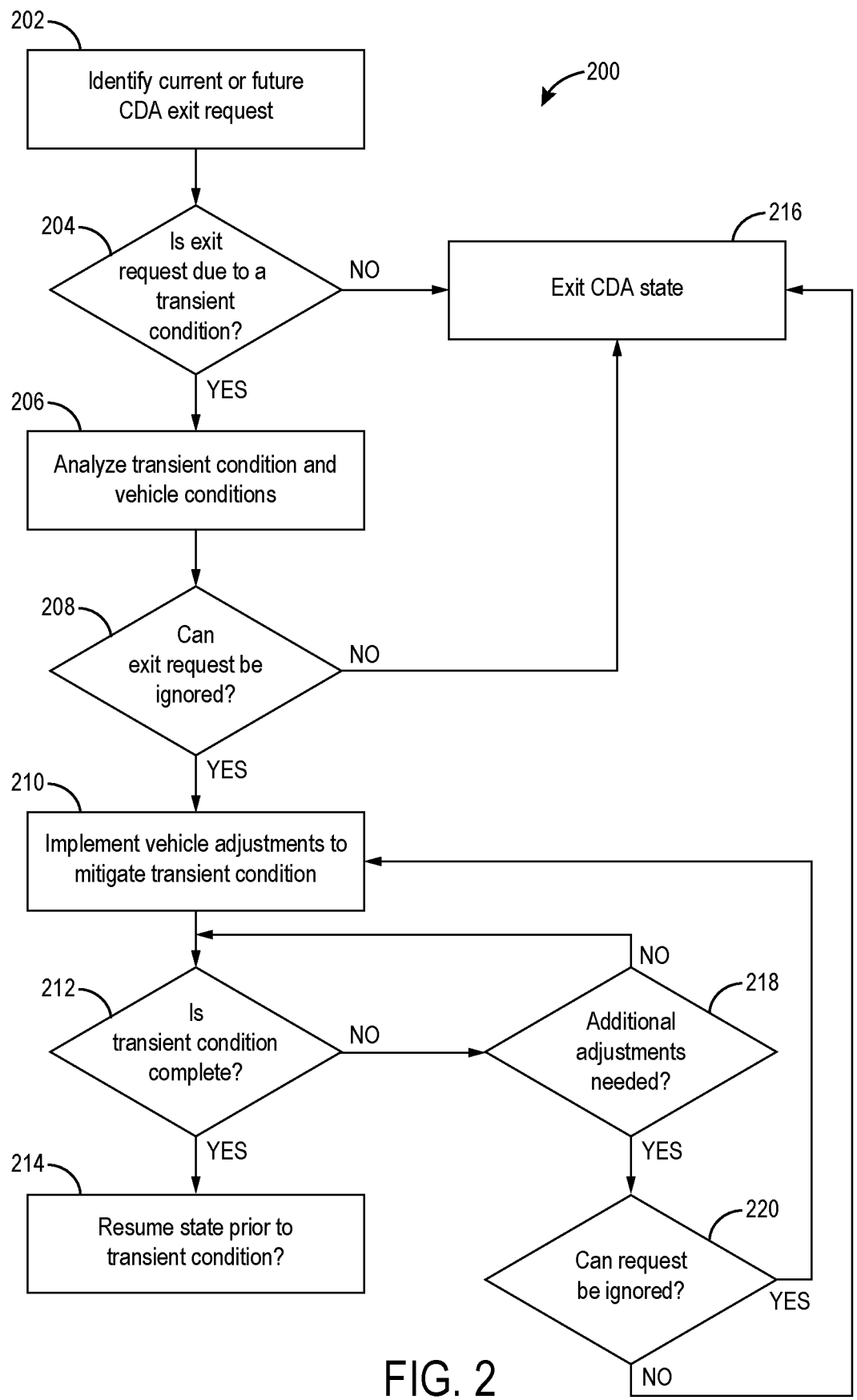
FIG. 2 is a flow diagram of a method to control cylinder reactivation, according to a particular embodiment.

Referring to FIG. 2, a flow diagram of a method 200 to control cylinder reactivation is shown, according to a particular arrangement. The method 200 can be implemented by the controller 106 in some embodiments.

At 202, a request to exit a CDA state is identified. For instance, the vehicle 102 may be in a CDA state because the vehicle 102 is traveling at a constant speed on a highway, thus requiring less power from the engine 104. In the CDA state, a subset of the cylinders 112-122 may be deactivated. In an example embodiment, in the CDA state only the first cylinder 112, the second cylinder 114, and the third cylinder 116 may be active, and the fourth cylinder 118, the fifth cylinder 120, and the sixth cylinder 122 may be deactivated. In another embodiment, the CDA state may be a state in which a subset of cylinders 112-122 of the engine 104 are dynamically deactivated based a power demand or request, an amount of torque required by the engine 104 (e.g., a skipfire state), and or a state of the vehicle 102. Thus, the cylinders active/inactive each cycle may change (i.e., dynamic skip fire) or stay the same throughout or substantially throughout operation of the CDA mode (i.e., fixed cylinder CDA mode). However, the exact active/inactive cylinders may differ in each CDA operating mode in the fixed cylinder CDA mode such that not the same cylinders are active or inactive in each CDA state operating mode. At some point, a request to exit a CDA state may be determined based on an accelerator pedal position exceeding a threshold and/or an amount of requested torque (e.g., by an operator or controls) exceeding an amount of available torque in the CDA state. The request to exit the CDA state may also be based on a change in a reference speed of the vehicle (e.g., changing a cruise control reference speed or changing from highway speed to residential street speed). In some implementations, the controller 106 may receive information from the sensors 108 and/or the network connection 110 indicating that it may be necessary to exit the CDA state. In one example, a gyroscope may detect that the vehicle 102 is currently on a steep incline/grade, and the controller 106 may determine that additional engine power is required for the vehicle 102 to climb the incline. As another example, the network connection 110 may receive traffic information indicating a slowdown in traffic ahead that will require stop-and-go driving (and thus more engine power). As yet another example, the network connection 110 may receive GPS information indicating multiple sharp curves ahead, which will require reduced speed to navigate. As still another example, the network connection 110 may receive weather condition data indicating adverse conditions ahead. Regardless of the information received, the controller 106 determines that it may be necessary to address the current or upcoming request to exit the CDA state. It should also be noted that in one or more embodiments, the information received by the controller 106 may include a change in throttle position of the vehicle 102, a change in engine power demand (from a driver or a module running on vehicle 102), and/or a request from a driver of vehicle 102. Controller 106 may also receive data from forward-looking radar and/or LIDAR systems of the vehicle 102.

At 204, a determination is then made as to whether the CDA exit request is due to a transient condition. As used herein, the term "transient condition" refers to a condition that is short in duration, distance, and/or elevation or grade. The precise amount of time that may constitute a transient condition may vary depending a variety of factors and system configurations. For example, in one implementation, a condition may be considered a "transient condition" if the duration is less than approximately 10 seconds, although the other times may be applicable in different systems and situations. In some embodiments, a transient condition may be associated with a particular elevation, grade, or geography in an upcoming portion of a road/route. In some implementations, a transient condition may be associated with a particular distance (e.g., 5000 feet). In one example where the vehicle 102 is on a steep incline, an optical sensor may indicate that the steep incline continues for approximately 5000 feet before leveling out again. Using the data from the optical sensor, the controller 106 may calculate that the vehicle 102 will reach the level area in approximately one minute, therefore the incline is a transient condition. Returning to the example where there is traffic ahead, the network connection 110 may provide data to the controller 106 indicating that the traffic slowdown continues for five miles and the average traffic speed is twenty miles per hour. Based on the data, the controller 106 determines that it will take approximately fifteen minutes before the traffic dissipates, therefore the traffic is not a transient condition. In the example where there are multiple sharp curves ahead, the network connection 110 may provide data to the controller 106 indicating that the sharp curves continue for one mile with an average traffic speed of twenty-five miles per hour. Based on the data, the controller 106 determines that it will take approximately two minutes and thirty seconds to reach the end of the sharp curves, and therefore the sharp curves are a transient condition.

If a determination is made that the exit request is not made due to a transient condition, then at 216 the vehicle exits the CDA state. Returning to the example of traffic ahead, the controller 106 determined that the traffic is not a transient condition, therefore the controller 106 instructs the engine 104 to exit the CDA state. Upon receiving the instructions from the controller 106, the fourth cylinder 118, the fifth cylinder 120, and the sixth cylinder 122 are reactivated such that all of the cylinders 112-122 are active.

If a determination is made that the exit request is made due to a transient condition, then the transient condition and the vehicle condition are analyzed at 206. For instance, the transient condition may be analyzed to determine its severity by analyzing data from an optical sensor (e.g., a five-degree incline may be less severe than a thirty-degree incline), and/or from the network connection 110 (e.g., a route with two stoplights may be less severe than a route with ten stoplights, or a traffic slowdown to twenty miles per hour may be less severe than a traffic slowdown to five miles per hour). The condition of the vehicle 102 may be analyzed to determine the status of properties of the vehicle 102, such as: acceleration of the vehicle 102, temperature of the engine 104, at least one temperature associated with an aftertreatment system, a current gear of the transmission, a battery charge level of one or more batteries associated with a hybrid powertrain of the vehicle 102 (if the vehicle 102 is a hybrid vehicle), whether the hybrid state is active or inactive (if the vehicle 102 is a hybrid vehicle), the status of braking systems (e.g., the engine brake, service brake, and/or regenerative brake), and other properties of the vehicle 102 that can impact the performance of the vehicle 102.

Returning to the example of a transient steep incline, the controller 106 may analyze data regarding the steep incline and determine the incline is a thirty-degree incline. The controller 106 may analyze data related to the condition of the vehicle 102 and determine that the vehicle 102 requires more power to travel up the incline than can be provided by the engine 104 in the CDA state.

In the example of the sharp curves, the controller 106 may analyze data regarding the sharp curves and determine that the sharp curves are easily navigable. The controller 106 may analyze data related to the condition of the vehicle 102 and determine that the vehicle 102 is capable of traveling along the sharp curves while the engine 104 is in the CDA state.

A determination is then made at 208 as to whether the request to exit the CDA state can be ignored. Returning to the example of the transient steep incline, because the controller 106 determined that the vehicle 102 needs more power to travel up the sharp incline, a determination is made that the request to exit the CDA state cannot be ignored, and the CDA state is exited at 216 such that the vehicle 102 can travel on the steep incline. Upon exiting the CDA state, the fourth cylinder 118, the fifth cylinder 120, and the sixth cylinder 122 are reactivated such that the engine 104 uses all of the cylinders 112-122 when traveling up the steep incline.

In the example of the sharp curves, because the controller 106 determined that the vehicle 102 is capable of traveling along the sharp curves while the engine 104 is in the CDA state, the determination is made that the request to exit the CDA state can be ignored. Accordingly, the CDA vehicle 102 remains in the CDA state when traveling along the sharp curves. The ignored request to exit the CDA state at 208 can later be allowed or cancelled based on the transient condition. For example, the transient condition may change after an initial assessment of the condition is made (e.g., a weather condition or a traffic condition may worsen) such that the request to exit the CDA state may no longer be ignored.

If a determination is made that the request to exit the CDA state cannot be ignored, the CDA state is exited at 216 such that the vehicle resumes non-CDA state operation.

If a determination is made that the request to exit the CDA state can be ignored, then adjustments required to mitigate the transient condition are implemented at 210. Such adjustments may be determined by the controller 106 and can include adjustments made to the vehicle 102 or the engine 104 to provide the ability to remain in the CDA state during the transient condition. In some embodiments, the adjustment can include downshifting (e.g., shifting to a lower gear), which may provide a power gain. Downshifting can occur automatically without action by the driver. Downshifting can also be executed by the driver in response to a visual or audial notification provided by the vehicle 102. The adjustment can also include activating exhaust gas recirculation, where a portion of the exhaust gas is recirculated back into the active cylinders to increase efficiency of the engine 104. In some arrangements, the adjustment can include adjusting the position of a variable geometry turbocharger, which changes the aspect ratio of the turbo portion of the engine 104 based on the speed of the engine 104. Such adjustments provide the engine 104 with the appropriate turbo boost at different engine speeds. The adjustment made by the controller 106 can also include applying electric power when the engine 104 is a hybrid engine in order to increase the efficiency of the engine 104 and/or provide additional needed power to propel the vehicle 102. In some implementations, the adjustment made by the controller 106 includes modifying how the fuel is injected into the activated cylinders. For example, the controller 106 can modify the fuel injection pressure, the fuel injection timing, and/or the fuel injection rate of the engine 104 such that the engine 104 can mitigate the transient condition. The adjustment can also include temporarily deactivating or reducing the functionality of one or more components of the vehicle 102 (e.g., the air conditioning system, the engine fan, etc.) that are consuming power such that the engine 104 uses the additional power to mitigate the transient condition. In some embodiments, the adjustment made by the controller 106 can include using a different engine map (e.g., the relationship between the air/fuel ratio and the ignition timing) to optimize the efficiency of the engine 104 to mitigate the transient condition. The controller 106 can also modify the CDA state (e.g., activating or deactivating one more additional cylinders while avoiding full reactivation or selecting a different skipfire pattern) such that the engine 104 can successfully mitigate the transient condition.

For example, returning to the transient condition with sharp curves, the controller 106 may determine that, in order to safely navigate the sharp curves while the engine 104 is in the CDA state, the power of one additional cylinder is required. Accordingly, the controller 106 activates the fourth cylinder 118 such that only the fifth cylinder 120 and the sixth cylinder 122 are deactivated.

A determination is then made at 212 as to whether the transient condition is complete. For example, based on data from the sensors 108 and/or the network connection 110, the controller 106 determines whether there are additional sharp curves ahead or if there are no longer sharp curves to navigate.

If the determination is made that there are no sharp curves ahead (e.g., if the vehicle 102 has successfully navigated through the transient condition of the sharp curves), the controller 106 determines at 214 that the adjustments to the vehicle 102 implemented at 210 are no longer necessary and the vehicle 102 can revert back to the state it was in prior to the transient condition. Accordingly, the controller 106 deactivates the fourth cylinder 118 such that the only active cylinders are the first cylinder 112, the second cylinder 114, and the third cylinder 116.

If the determination is made that there are additional sharp curves ahead (e.g., if the vehicle 102 is still navigating through the transient condition of the sharp curves), the controller 106 determines if additional adjustments are needed at 218. For example, the controller 106 may initially determine that the size and/or shape of the sharp curves ahead by a GPS input. As the vehicle approaches the sharp curves, the size and/or shape of the sharp curves as determined by an optical sensor may match the size and/or shape of the sharp curves as determined by the GPS input, and no further adjustments are needed. The method 200 returns to 212.

In another example, as the vehicle approaches the sharp curves, the size and/or shape of the sharp curves as determined by the optical sensor may not match the size and/or shape of the sharp curves as determined by the GPS input (e.g., the sharp curves may have a different geometry than provided by the GPS input, and thus the transient condition has been modified). The controller 106 may determine that additional adjustments are needed to mitigate the modified transient condition.

A determination is then made as to whether the request to exit the CDA state can be ignored at 220 based on the required additional adjustments. If the controller 106 determines that additional adjustments can be made to mitigate the modified transient condition, the method 200 returns to 210 such that the adjustments are implemented.

If the controller 106 determines that, based on the modified transient condition, the request to exit the CDA state cannot be ignored, the method 200 returns to 216 such that the CDA state is exited and the vehicle returns to non-CDA state operation. For example, the controller 106 may determine that the sharp curves as identified by the optical sensor require more torque to navigate than is available in the CDA state, therefore the CDA state must be exited in order to safely navigate the curves.

IV. Additional Example Scenarios

In addition to the examples provided above, there are many other scenarios in which the described method can be implemented.

In one example scenario, a vehicle is traveling along a highway in a CDA state and the controller 106 determines that the driver is changing lanes and passing another vehicle. The determination may be made by the controller 106 using data from the sensors 108, GPS data, activation of the turn signal, or the driver depressing the accelerator. The controller 106 may further determine that the lane change is a transient condition that can be mitigated by down shifting, turning off one or more components (as described), and/or using electric motors (if the vehicle is a hybrid vehicle). The mitigation enables the vehicle to change lanes to pass the other vehicle without exiting the CDA state. After the vehicle has completed the pass, the mitigations may be removed or cancelled.

In another example scenario, a vehicle is traveling along a highway in a CDA state with the cruise control engaged at sixty-five miles per hour (mph). The cruise control may be set to apply additional throttle when the vehicle speed drops below sixty-three mph to maintain the vehicle speed. The controller 106 may determine that a slight elevation increase is causing the vehicle to slow down, which may cause the cruise control to request the vehicle exit the CDA state to provide the additional throttle. However, the controller 106 may also determine that the elevation increase only occurs for approximately a quarter of a mile, the elevation increase therefore being a transient condition. The controller 106 may then ignore the request to exit the CDA state. Alternatively, the controller 106 may temporarily change the cruise control requirements during the transient condition such that the speed of the vehicle must drop below fifty-nine mph before additional throttle is applied, thereby avoiding a request to exit the CDA state from the cruise control. After the transient condition passes, the controller 106 may reset the cruise control requirements.

In yet another example scenario, a vehicle in a CDA state may be stopped at a first stoplight. The controller 106 determines that there is a second stoplight that is one block away, and the second stoplight is red. When the first stoplight turns green, the driver may depress the accelerator down by a substantial amount, which would normally cause the vehicle to exit the CDA state in order to accelerate rapidly. However, because the controller 106 determined that the second stoplight is red, the controller 106 may prevent the vehicle from exiting the CDA state in anticipation of another stop at the second stoplight.

V. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the term "approximately" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language a "portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Although only a few embodiments have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative embodiments. Other substitutions, modifications, changes, and omissions may also be made in the design, operating conditions and arrangement of the various exemplary embodiments without departing from the scope of the present disclosure.

What is claimed is:

1. A method for delaying cylinder reactivation in a vehicle, comprising:
    identifying, by a controller, a request to exit a cylinder deactivation state for an engine system of the vehicle, while the cylinder deactivation state is present;
    determining, by the controller, if the request is due to a transient condition;
    in response to the controller determining that the request is due to the transient condition, analyzing, by the controller, the transient condition and a condition of the vehicle based on data from a sensor, wherein the data from the sensor comprises a grade of a road being traversed by the vehicle or a size and shape of a curve in the road being traversed by the vehicle;
    determining, by the controller, a first adjustment to the vehicle based on the analyzing by the controller the transient condition and the condition of the vehicle, the first adjustment configured to mitigate the transient condition;
    implementing, by the controller, the first adjustment to the vehicle without exiting the cylinder deactivation state, the first adjustment comprising at least one gear shift event;
    monitoring, by the controller, the transient condition to determine at least one change to the transient condition;
    in response to the at least one change to the transient condition, determining, by the controller, a second adjustment to the vehicle, wherein the second adjustment is at least one of implementing a gear shift event, activating exhaust gas recirculation, or adjusting the position of a variable geometry turbocharger; and
    implementing, by the controller, the second adjustment with the vehicle.

2. The method of claim 1, further comprising:
    determining, by the controller, if the transient condition is complete; and
    in response to a determination by the controller that the transient condition is complete, returning the engine system to a previous state.

3. The method of claim 1, further comprising:
    determining, by the controller, if the request to exit the cylinder deactivation state for the engine system can be ignored; and
    in response to the controller determining that the request to exit the cylinder deactivation state for the engine system cannot be ignored, exiting the cylinder deactivation state for the engine system.

4. The method of claim 1, wherein the determinations made by the controller are made based at least in part on data received from one or more sensors coupled to the vehicle.

5. The method of claim 1, wherein the determinations made by the controller are made based at least in part on data received from a network connection.

6. The method of claim 1, wherein the request to exit the cylinder deactivation state is based on one or more of a weather condition and a traffic condition.

7. The method of claim 1, further comprising:
    in response to determining, by the controller, that the request to exit the cylinder deactivation state is not due to the transient condition, exiting the cylinder deactivation state.

8. A system for delaying cylinder reactivation in a vehicle, comprising:
    an engine system comprising a first cylinder and a second cylinder;
    a controller coupled to the engine system, the controller configured to;
        identify a request to exit a cylinder deactivation state for the engine system, while the cylinder deactivation state is present;
        determine whether the request is due to a transient condition;
        in response to the controller determining that the request is due to the transient condition, perform an analysis of the transient condition and a condition of the vehicle based on data from a sensor, wherein the data from the sensor comprises a grade of a road being traversed by the vehicle or a size and shape of a curve in the road being traversed by the vehicle;
        determine a first adjustment to the vehicle based on the analysis, the first adjustment configured to mitigate the transient condition;
        implement the first adjustment with the system without exiting the cylinder deactivation state, the first adjustment comprising at least one gear shift event;
        monitor the transient condition to determine at least one change to the transient condition;
        in response to the at least one change to the transient condition, determine a second adjustment to the vehicle, wherein the second adjustment is at least one of implementing a gear shift event, activating exhaust gas recirculation, or adjusting the position of a variable geometry turbocharger; and
        implement the second adjustment with the vehicle.

9. The system of claim 8, wherein the controller is further configured to:
    determine whether the transient condition is complete; and
    in response to a determination that the transient condition is complete, return the engine system to a previous state.

10. The system of claim 8, wherein the controller is further configured to:
    determine whether the request to exit the cylinder deactivation state for the engine system can be ignored; and
    in response to determining that the request to exit the cylinder deactivation state for the engine system cannot be ignored, exit the cylinder deactivation state for the engine system.

11. The system of claim 8, wherein the determinations made by the controller are made based at least in part on data received from one or more sensors.

12. The system of claim 8, wherein the determinations made by the controller are made based at least in part on data received from a network connection.

13. The system of claim 8, wherein the request to exit the cylinder deactivation state is based on one or more of a weather condition and a traffic condition.

14. The system of claim 8, wherein the controller is further configured to exit the cylinder deactivation state after determining that the request to exit the cylinder deactivation state is not due to the transient condition.

15. A method for delaying cylinder reactivation in a vehicle including an engine system coupled to a controller, a sensor, and a network connection, the method comprising:
- identifying, by the controller, a request to exit a cylinder deactivation state for the engine system, while the cylinder deactivation state is present;
- determining, by the controller, if the request is due to a transient condition;
- in response to the controller determining that the request is due to the transient condition, analyzing, by the controller, the transient condition and a condition of the vehicle based on data from a sensor, wherein the data from the sensor comprises a grade of a road being traversed by the vehicle or a size and shape of a curve in the road being traversed by the vehicle;
- determining, by the controller, a first adjustment to the vehicle based on the analyzing by the controller the transient condition and the condition of the vehicle, the first adjustment configured to mitigate the transient condition;
- implementing, by the controller, the first adjustment to the vehicle without exiting the cylinder deactivation state, the first adjustment comprising at least one gear shift event;
- monitoring, by the controller, the transient condition to determine at least one change to the transient condition;
- in response to the at least one change to the transient condition, determining, by the controller, a second adjustment to the vehicle, wherein the second adjustment is at least one of implementing a gear shift event, activating exhaust gas recirculation, or adjusting the position of a variable geometry turbocharger; and
- implementing, by the controller, the second adjustment with the vehicle.

16. The method of claim 15, further comprising:
- determining, by the controller, if the request to exit the cylinder deactivation state for the engine system can be ignored; and
- in response to the controller determining that the request to exit the cylinder deactivation state for the engine system cannot be ignored, exiting the cylinder deactivation state for the engine system.

17. The method of claim 15, further comprising:
- determining, by the controller, if the transient condition is complete; and
- in response to a determination by the controller that the transient condition is complete, returning the engine system to the cylinder deactivation state.

* * * * *